April 4, 1950  W. R. FETZER  2,502,935
METHOD OF DRYING SIRUP
Filed Dec. 22, 1947
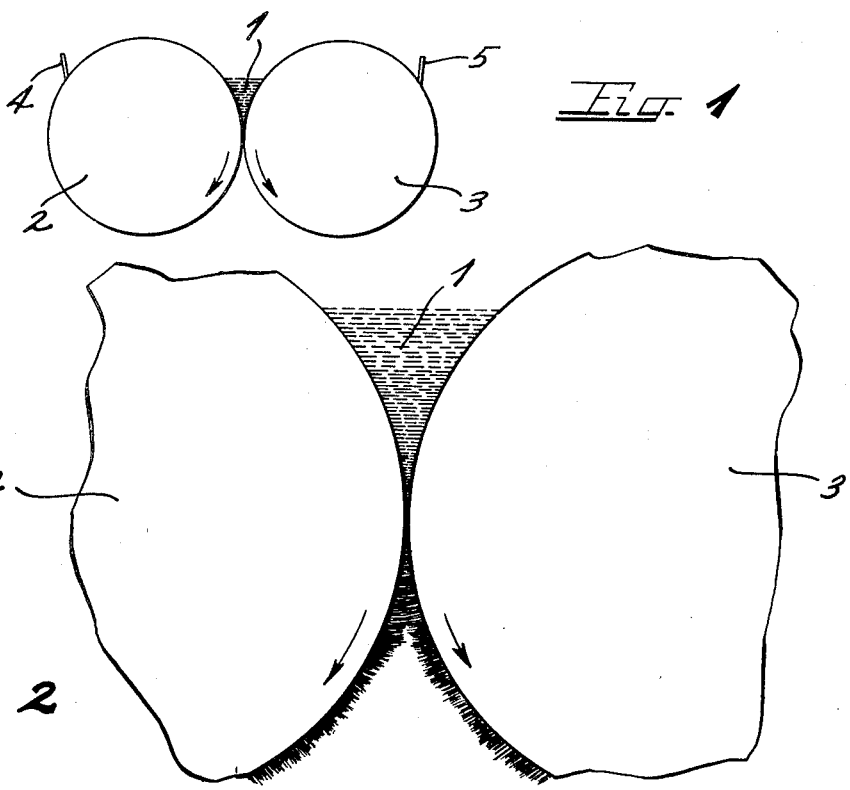
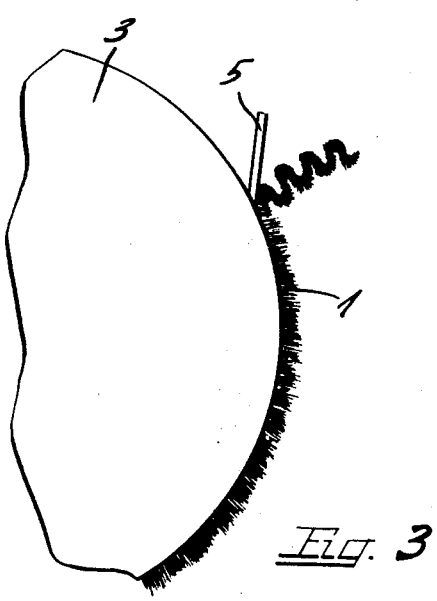
Inventor
Walter R. Fetzer
by Frank J. Foley
Atty.

Patented Apr. 4, 1950

2,502,935

UNITED STATES PATENT OFFICE 2,502,935

METHOD OF DRYING SIRUP

Walter R. Fetzer, Clinton, Iowa, assignor to Clinton Industries, Inc., Clinton, Iowa, a corporation of Delaware Application December 22, 1947, Serial No. 793,289

7 Claims. (Cl. 127—34)

This invention relates to improvements in the manufacture of dehydrated syrups, and relates particularly to the dehydration of syrups produced by hydrolysis of starch, of which the well known corn syrup of commerce is an example.

This application is a continuation-in-part of my application, Serial No. 604,869, filed July 13, 1945, now abandoned, for "Dried corn syrup and method of producing the same."

As this invention is especially suitable for and commercially adaptable to the drying of corn syrup, it will be explained herein as applied to that product.

The ordinary corn syrup of commerce has largely been sold and used in the liquid state in which it is manufactured. However, a dried form of the syrup offers some advantages, especially from the standpoint of packaging and shipping. Several methods of producing the dried syrup have been employed heretofore, such as (1) spray drying, and (2) concentration in vacuo to a high solids content with subsequent cooling at atmospheric pressure to a solid, followed by grinding to a desired product size. Each of the methods has yielded products having characteristics specific to the process employed, but each leaves much to be desired from the standpoint of a satisfactory commercial product.

Spray drying involves atmospheric dehydration of atomized droplets of syrup in a stream of hot air, wherein the drying is largely from the surfaces of the droplets. Heat economies require high air temperatures which discolor heat-sensitive materials. Rapid dehydration at the high spray drying temperatures forms an impervious layer or "skin," on corn syrup droplets, and the resulting particles contain a high internal moisture, which equilibrates later in a mass of the product, often producing a solidified mass.

Dried corn syrup produced by concentration in vacuum pans, is similar in appearance to hard candy. However, since the product is a dense mass of corn syrup, economical concentration to a low moisture content requires high temperatures which cause undesirable discoloration of the product. Subsequent grinding of such a dried product is carried out with difficulty, if a fine uniform product is desired.

Many of the corn syrups which are desirable to dry are extremely light in color, often a pale amber, or even almost water clear. If undarkened during drying, as can be attained in accordance with my invention, a white or nearly white pulverulent product is obtainable from such syrups and is commercially desirable.

Single or double drum driers operating in the atmosphere or in vacuum chambers have been used successfully heretofore for drying milk, milk products and other liquids, but corn syrup has never been dried on a successful commercial scale heretofore on any kind of a drum drier. Whereas films of various other liquids readily dry on heated drums to a powdery or flaky condition of a desirably low moisture content, prior attempts to dry films of corn syrup on heated drums have always failed.

The films of corn syrup merely became gummy masses with undesirably high moisture content. The use of higher drum temperatures to dry these corn syrup films inevitably darkened the product and rendered it unfit for use.

However, I have discovered how to dry corn syrup successfully on drums. By maintaining certain operating conditions described hereinafter, I am able to cause the syrup films emerging from the bight of opposed drums operating in a vacuum chamber to string out into a multitude of filaments as the drum surfaces separate. The resultant filaments expose more surface for dehydration than if the syrup remained as films on the drums.

The filaments of syrup stiffen as water is removed, and tear apart as the drums revolve further, leaving the filaments extended from the drums for further dehydration and stiffening as the drums continue to revolve. The scraper blades partially compact the dried filaments into porous, fibrous webs or folds as the material is removed from the drum. These webs possess high porosity between the loosely compacted filaments, facilitating continued dehydration while the material remains in the vacuum chamber. The large surface area produced by the filaments enables me to obtain a dried syrup with a residual moisture content as low as one-half per cent if desired without darkening the product.

One of the objects of the invention is to provide a new method of dehydrating corn syrups resulting from hydrolysis of corn starch.

One of the specific objects of this invention is to provide a method of producing dried corn syrup in a variety of physical sizes and permitting easy comminution, if desired.

Another object of this invention is to provide a dried corn syrup product having a smaller ratio of surface area to mass as compared to the dried products of other processes, whereby there is obtained a decreased apparent hygroscopicity, which permits several new advantages from the standpoint of use, handling and packaging.

Another object of the invention is to provide a dried corn syrup which can be produced in a variety of lump sizes, which are porous and redissolve readily when reconstituted in a variety of food products.

Another object of this invention is to provide a method for the dehydration of corn syrup under vacuum, wherein dehydration is accomplished at low temperatures and wherein water removal is obtained with the maximum utilization of the heat applied.

Another object of this invention is to provide a method of dehydration wherein the starting material may be a high density commercial liquid syrup of 40° to 45° Bé., obtained directly from factory vacuum evaporators thus reducing to a minimum the amount of water for final removal.

Another object of this invention is to provide a method of dehydration wherein a dried corn syrup product can be obtained with a minimum loss of product through dusting and a minimum loss of heat in processing.

Another object of the invention is to provide a new and simplified method of producing dried corn syrup especially adapted for the processing of various grades of corn syrup commonly manufactured in the industry.

Another object of the invention is to provide a new method for the manufacture of dried corn syrup which may be easily controlled and regulated to attain uniform results under efficient methods of operation.

Another object of the invention is to provide a new method of manufacturing dried corn syrup especially suitable for large scale and continuous operation, and adapted to avoid operational difficulties and shut-downs such as characterize certain dehydrating operations now in industrial use.

Other and further advantages of the invention will be specifically alluded to hereinafter or will become apparent from a perusal of the specification herein.

Since the invention does not reside in the apparatus, and since drum driers and double drum driers operating in vacuum chambers have been used heretofore for producing other products, this specification will not describe in detail the construction of such apparatus. It is sufficient to illustrate diagrammatically the manner in which corn syrup reacts when dried upon such drums. Referring now to the drawings:

Figure 1 shows diagrammatically a pair of drums rotating in juxtaposition. It will be assumed that any usual or suitable method of supplying steam or other heating medium to the interiors of the drums will be utilized, as in common practice.

Figure 2 shows diagrammatically on an enlarged scale the passage of the corn syrup through the bight of the drums and the formation which it assumes as and after it leaves the bight of the drums.

Figure 3 is a view showing the appearance of the coating of syrup as it approaches the scraper blade and is being scraped off by the scraper blade from the drum.

Figure 4 is a plan view of a portion of a layer of the hair-like filaments, as removed by the scraper blades, on a further enlarged scale.

Figure 5 is an end view of the portion shown in Figure 4.

For purposes of illustration, I shall describe the drying of standard confectioners' corn syrup of the following approximate composition, dry basis:

| | |
|---|---|
| D. E. (dextrose equivalent) | 42 |
| Dextrin _____per cent__ | 37 |
| Dextrose _____do____ | 22 |
| Maltose and higher sugars_____do____ | 41 | with a commercial gravity of 43° Bé. containing 19.7% moisture. The drum chamber is evacuated to at least 28½ inches of mercury, preferably higher. The spacing between the rolls is set at 0.003 inch and the rolls are revolved at 4 R. P. M., with steam pressure maintained in the rolls at 30 to 55 pounds, gauge pressure. The drums employed are each 42 inches in diameter and 10 feet long, and the scraper blades are positioned substantially as shown in the drawing. The syrup at a temperature of 80° to 100° F. is introduced into the chamber by the vacuum. A well or pool of syrup between the rolls is maintained by continuous introduction of the syrup.

While the syrup is lying in the pool, it is, of course, subject to the heat of the drums and to the drying action of the low pressure atmosphere, hence some desiccation of the syrup will occur at that point.

As the drums rotate, each carries a film of syrup through the bight, and as these films begin to separate below the bight, each acts upon the other whereby the two films are drawn into a multitude of hair-like filaments extending outwardly from the drum surfaces. This phenomenon, I conclude, is due in large part to the dextrin present in such a syrup and probably due to the physical condition of the dextrin at that time, when the process is being properly operated and controlled to produce this result. What part the other constituents of the syrup have in this effect is not known at present.

The coating of syrup on each drum after being drawn into this shape should retain the filament form as it rotates through the vacuum chamber toward the scraper blades 4 and 5. It will be noted that the greater portion of the syrup constituting each film as it emerged from the bight has now been drawn into filaments separate from each other and each of which presents a large amount of surface exposed to the rarefied atmosphere in the vacuum chamber. To make it clear how unusual is this phenomenon, it will be recalled that in drum drying processes for drying materials other than corn syrup, using either a single or double drum, as heretofore practiced, the film deposited on the drums usually retains its original status as a film as it approaches the scraper blades, excepting that in the case of some products the film may dry eventually into flake form. In such cases, the entire mass of the film lies in close contact with the heated drum. However, in the present invention, most of the material of each original film is eventually drawn into a multitude of filaments whose bases only are in contact with the drums.

The greatly increased surface area, therefore, provides much greater capacity for evaporation per unit of heating surface area.

As illustrated in Figure 3, when the filament coating comes into contact with the scraper blade, it tends to compact somewhat as it rolls off the scraper blade. However, this compacting is only of a very loose nature and does not amount to solidification of the filaments with each other. Consequently, the product, after removal from the drum, has the appearance shown in Figures 4 and 5, constituting clusters or bunches of filaments between which there are ample spaces permitting further drying of the product so long as it remains within the vacuum chamber.

It is preferred to dry the syrup substantially to its final desired moisture content while it is still on the drum, although further drying, as said before, will continue while the product is being removed from the chamber according to any well known method or apparatus for accomplishing that result, such apparatus preferably being designed to interfere as little as possible with the maintenance of the vacuum in the chamber so that the operation may be continuous.

Usually it will be desired to dry the syrup down to about 4% or less moisture, and it is found that this result is easily obtained in accordance with this invention.

The product, after removal from the vacuum chamber, may be used exactly in the form in which removed, that is, in clusters or bunches of indeterminate size consisting largely of the filament form. If desired, these clusters may be separated according to size. For some purposes, it may be desirable to break the clusters down into finer particles such as a powder, and this is easily done by common methods. The product processed in accordance with this invention will not be tacky or sticky and can be packed immediately or ground if desired.

The invention is not confined to the above example, for it is at once apparent to one skilled in the art that if, for example, 45° Bé. corn syrup of 15.7% moisture content be employed, there will be less water to be removed. Further, that the higher the vacuum the greater will be the capacity, or the lower will be the residual moisture at equal capacity. Further, the higher the sensible heat of the syrup fed, the greater the heat available for dehydration. In other words, there is a variety of conditions that may be applied to produce a maximum output of a product containing a minimum or a practical amount of moisture. Further, that corn syrup may be altered in composition as to dextrin and sugar content either by hydrolysis or by compounding, or as to moisture content by varying the concentration of the liquid, one requirement as to composition being that it contain sufficient dextrin to produce filaments as the rolls separate and sufficient dextrin to produce rigidity at the time these filaments are compressed by the scraper blade.

Various well known corn syrups whose D. E. range from 30 to 43 may be dried in accordance with this process. The dextrose content of such syrups usually ranges between 12 and 23, the dextrin content between 48 and 36, while the maltose and higher sugars range between 40 and 41.

Dried corn syrup made in accordance with this invention is completely and quickly soluble in water, and by the addition of a suitable amount of water may be restored to syrup form, if desired. While I have indicated an analysis of a typical standard corn syrup, those who are skilled in this art will understand that there are other grades of corn syrup, each composed somewhat differently. Any such syrup having a large percentage of dextrin may be dried in accordance with this invention. It will be perceived, however, that if one attempts to dry in accordance with this invention a syrup low in those constituents which provide the plastic or tacky effect which enables the two films to draw each other out into the numerous filaments herein described, the efficient high rate of drying obtainable from this invention under the preferred operating conditions will not be obtained. As it is believed that the dextrin is largely responsible for this plasticity or tackiness, ordinarily it may be expected that the dextrin content should not be too low.

It is obvious that a condition of considerable tackiness and plasticity is required to be present in the films as they emerge below the bight. Accordingly, whatever may be the analysis of the starch syrup under treatment, it should not be so dilute with respect to total solids or dextrin as to come through the bight in a film having insufficient tackiness or stringiness.

It is clear that one skilled in this art having an understanding of the principles of this invention will readily be able to regulate the operating conditions so that the right degree of tackiness will be obtained in the film to produce a desirable filament formation, and this, coupled with proper vacuum and drum temperature conditions and time intervals of the travel from the bight to the scraper blade, and clearance between the drums should result in successful operation of the invention. Not much variation in bight clearance would be practical, as the only requirement is to prevent free running of the syrup but permit the passage of two films which will pull out into the desired filaments. The drum temperature should be high enough to promote drying of the filaments before they reach the scrapers, but not so high as to make the filaments so fluid that they melt and collapse. A range of 274 to 305° F. is deemed practical for the syrups under consideration, but should be regulated by the operator to produce the best filament formation and to yield a friable product of the required moisture content. Should the drum temperature run too low the syrup will fail to dry on the drums and the filaments will not draw out into the multitude of fine filaments which best facilitate the drying of the syrup.

By using a variable speed drive on the drums, the operator can obtain additional control over the process.

The simplicity and ease of manipulation and operation of this invention will now be apparent. It is furthermore important to note that the product under consideration, that is, corn syrup of commercial grades, is a low priced product and does not sell at any such high price per pound as do many products heretofore dried in other forms on drum driers. Consequently, the processing cost per pound for producing this dried product must be kept low in order that the dried product may be competitive not only with dried syrups produced by other methods, but also with the usual commercial liquid syrups. This invention, therefore, conforms to that requirement.

The finished product, which has come off the drums in filament form, is especially well adapted to resist compacting and solidification if accidentally exposed to moist atmospheres, perhaps better so than the finely powdered or amorphous forms of dried corn syrup produced by other processes.

It will be appreciated, no doubt, that while an apparatus consisting of double drum driers rotating in a vacuum chamber affords an economical means of performing this invention, other apparatus might also be useful, provided it can duplicate or approximately duplicate the operating conditions herein described. All such variations and modifications of the invention are intended to be included within and covered by the appended claims. The drawing shows, for illustrative purposes, the appearance of such a filament formation, while on the drums, and during and after removal therefrom, but it is not intended that the invention is to be limited thereby, as other methods of removal of the dried product may be used in conjunction with drums or other apparatus.

This invention also comprehends the dehydrating, in accordance with the method of this invention, of any syrup produced by the hydrolysis of starch or any syrup composition prepared or adapted to utilize the principles of this invention to yield the tackiness and plasticity which makes possible the filament formation herein described. While a moisture content, produced by the method of this invention, ranging between four per cent and one percent, or even less, will often be desired and is easily attained, the practice of the invention is obviously not limited to any special range but will include whatever moisture content is deemed desirable.

The drum speed variations which may be used are related to the condition of the liquid product, the drum temperatures and sizes and the distance between the bight and each scraper blade. On the machine described, the drum speed may be varied between 1.9 and 4.0 R. P. M. The bight gap can be varied about 0.002 inch either way from 0.003 inch. Steam, which is a satisfactory heating medium for the drums, may usefully be varied from 30 to 55 pounds gauge pressure.

With the described example as a guide and within the various operating factor ranges indicated, the process may be successfully practiced on the various syrups mentioned by visually observing the filament formation through portholes and regulating the controls to produce good filament formations and the drying of the filaments to the required moisture content.

Having shown and described my invention, I claim:

1. A method of drying corn syrup of 40 to 45° Bé. density and having a D. E. of 30 to 43 comprising depositing a layer of the concentrated corn syrup on a heated surface in a vacuum chamber, depositing another layer of the concentrated syrup on another heated surface in the vacuum chamber, contacting said layers momentarily with each other while the layers are maintained at such viscosity that the contact and subsequent separation draws both layers out into a generally uniform mass of filaments extending outwardly from said heated surfaces, and maintaining the filament formations subject to a vacuum of at least 28½ inches and the heat from said surfaces until the filaments are dried to a friable product having a moisture content of less than 4%.

2. A method of drying corn syrup of 40 to 45° Bé. density having a D. E. within the range of 30–43 and dextrin content within the range of 48–36, comprising rotating a pair of opposed heated drums in a vacuum chamber maintained at high vacuum of at least 28½ inches, supplying the syrup to a pool formed above the bight of the drums, maintaining the spacing of the drums to cause a thin film of syrup to emerge on each drum below the bight, heating the drums internally with steam at 30 to 55 pounds gauge pressure, scraping the dried syrup from each drum remotely from the bight, and regulating the drum temperature relatively to the dextrin content of the syrup to cause the film on each drum as it emerges from the bight to adhere for a short distance to the opposing film and each to draw the other out into a multitude of hair-like filaments which maintain their filament form until dried to a friable condition and removed by scraping from the drums.

3. A method of drying corn syrup having a D. E. between 30 and 43 and a density between 40 and 45 Bé., comprising continuously supplying the syrup to a pool above the bight formed by a pair of opposed drums rotating in a vacuum chamber, maintaining a vacuum of at least 28½ inches maintaining the drums heated with steam at 30 to 55 pounds, regulating the drum temperature relatively to the syrup being dried to cause the films on the drums emerging below the bight to draw each other out into a multitude of filaments and to cause said filaments to retain their filament formation until the syrup comprising them is dried to a friable product having a moisture content of 4% or less.

4. A method of drying corn syrup having a D. E. between 30 and 43 and a density between 40 and 45 Bé., comprising rotating a pair of heated drums in a vacuum chamber substantially in mutual contact, maintaining a vacuum of at least 28½ inches supplying a coating of syrup to that portion of each drum surface which is closely approaching the bight of the drums, heating the drums with steam at 30 to 55 pounds, and regulating the drum temperature relatively to the drum speed to cause the films on the drums emerging from the bight to draw each other out into a multitude of filaments and to cause said filaments to retain their filament formation until the syrup comprising them is dried to a friable product having a moisture content of 4% or less.

5. A method of drying corn syrup having a D. E. between 30 and 43 and a density between 40 and 45 Bé., comprising rotating a pair of heated drums in a vacuum chamber substantially in mutual contact, maintaining a vacuum of at least 28½ inches supplying a coating of syrup to that portion of each drum surface which is closely approaching the bight of the drums, heating the drums to a temperature in the range of 274 to 305° F., and regulating the drum temperature relatively to the drum speed to cause the films on the drums emerging from the bight to draw each other out into a multitude of filaments and to cause said filaments to retain their filament formation until the syrup comprising them is dried to a friable product having a moisture content of 4% or less.

6. A method of drying corn syrup of 40 to 45° Bé. density and having a D. E. of 30 to 43 comprising rotating a pair of closely spaced heated drums in a vacuum chamber, feeding the syrup to the drums above the bight formed by their surfaces, regulating the drum temperature and the drum speed relatively to the observable tackiness of the syrup to cause the films on each drum emerging below the bight to react with each other to draw the films out into coatings of hair-like filaments of syrup extending outwardly from the drums and to cause said filaments to retain their filament formation, continuing the desiccation of the syrup while in filament formation to a friable condition, maintaining a vacuum of at least 28½ inches, and removing the dried syrup from the drum surfaces.

7. A method of drying corn syrup of 40 to 45° Bé. density and having a D. E. of 30 to 43 comprising rotating a pair of opposed heated drums in a vacuum chamber, feeding syrup to the drums above the bight formed by their surfaces, causing the syrup to emerge from the bight first as a film on each drum, controlling the tackiness of the films by regulating the drum temperature relatively to the syrup density whereby each draws the other out into numerous hair-like filaments based upon the drums, maintaining on each drum after separation of the films a coating of said filaments until the syrup is dried to a friable condition, maintaining a vacuum of at least 28½ inches and removing the coatings from the drum surfaces at positions remote from the bight.

WALTER R. FETZER.

REFERENCES CITED

The following references are of record in the file of this patent:

UNITED STATES PATENTS

| Number | Name | Date |
|---|---|---|
| 758,065 | Hall | Apr. 26, 1904 |
| 1,954,602 | Supplee | Apr. 10, 1934 |
| 2,189,824 | Walsh | Feb. 13, 1940 |
| 2,192,951 | Wolff | Mar. 12, 1940 |
| 2,192,952 | Wolff | Mar. 12, 1940 |

FOREIGN PATENTS

| Number | Country | Date |
|---|---|---|
| 28,895 | Australia | Sept. 8, 1930 |